May 7, 1968

R. C. RIKE 3,381,653

BRAKE LINING WEAR SIGNAL WITH CENTRIFUGAL CONTROL

Filed Feb. 2, 1967

INVENTOR.
Richard C. Rike
BY
C. L. Eagle
ATTORNEY

3,381,653
BRAKE LINING WEAR SIGNAL WITH CENTRIFUGAL CONTROL
Richard C. Rike, Dayton, Ohio, assignor to General Motors Corporation, Detroit, Mich., a corporation of Delaware
Filed Feb. 2, 1967, Ser. No. 613,553
7 Claims. (Cl. 116—114)

ABSTRACT OF THE DISCLOSURE

In preferred form, this disclosure describes a brake lining wear signalling device including a centrifugally controlled striker mounted on a conventional vehicle wheel and movable between operative and inoperative positions in response to vehicle speed. An associated spring has one end connected to a brake shoe web and the other end releasably secured in the lining mounted on the shoe. A predetermined amount of lining wear releases the one spring end for engagement by the striker, only during relatively low vehicle speeds, to provide an audible signal during each revolution of the wheel drum.

---

This invention relates to a brake lining wear signalling device informing the operator that the linings are worn only during relatively low vehicle speeds.

Many brake lining wear signalling devices have been constructed in the past which include an arrangement wherein the signal is continuous as long as the vehicle is in motion. The continuity of such a signal rapidly becomes objectionable to the operator and is particularly distracting at high speeds. It is, therefore, a purpose of this invention to provide an audible signal indicating the linings are worn at relatively low vehicle speeds, such as below 20 miles per hour for example, but which becomes inoperative and is discontinued during moderate and high speed operation.

Accordingly, among the objects of this invention is the provision of an improved mechanical brake lining wear audible signalling device that is readily attachable to a conventional wheel and brake drum assembly.

Another object of this invention is the provision of a resilient member that is intermittently engaged by a member attached to the vehicle wheel drum to provide an audible signal during each engagement.

Another object of this invention includes the mounting of a resilient member upon a brake shoe web and temporarily securing a normally free end of this member to an inoperative position at a selected portion of the brake lining whereby a sufficient amount of lining wear will result in release of the free end for engagement by a lever pivotally attached to the wheel drum.

A further object of this invention includes the provision of a centrifugally controlled member attached to the wheel drum such that it automatically responds to vehicle speed and renders the signalling mechanism operative and inoperative in accordance with a predetermined speed.

A still further object of this invention includes the provision of a brake lining wear indicating device wherein upon the occurrence of sufficient lining wear a resilient member is positioned to be engaged only during speeds below a preselected maximum speed by a centrifugally controlled lever pivotally mounted upon the wheel drum.

Other objects, features and advantages of the subject invention will become apparent upon reference to the succeeding detailed description and drawings showing the preferred embodiment thereof, wherein.

Figure 1:
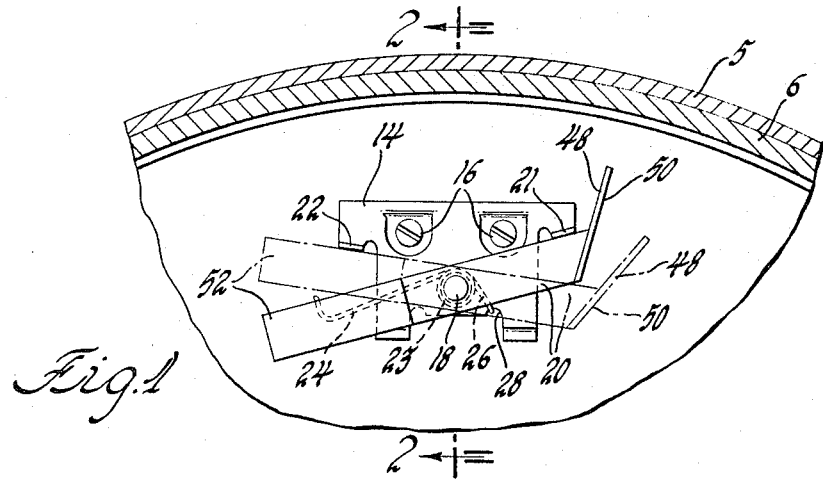
FIGURE 1 is a fragmentary view, partly in section and partly in elevation and taken on lines 1—1 of FIGURE 2 to illustrate the striker lever pivotally secured to the wheel drum.
Figure 4:
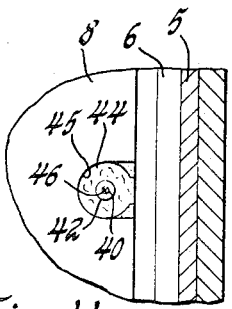
FIGURE 4 is a cross sectional view taken on lines 4—4 of FIGURE 2.

Referring now to the drawings, a brake drum assembly is depicted comprising a wheel 5, a brake drum 6, and a brake shoe 8 having a lining 10 mounted thereon. The brake shoe 8 includes a depending reinforcing web 12 which is operated by any suitable means well known in the art to the engaged brake apply position shown in the drawings. A bracket 14 is secured to the wheel and drum assembly by bolts 16 and supports a pin 18 which in turn has a striker lever 20 pivotally mounted thereon. The striker lever 20 is rotatable between the solid and broken line positions to engage stop lugs 21 and 22 on the bracket 14. A torsion spring 23 has a first leg 24 which engages the lever 20 and a second leg 26 which is received within a notch 28 of bracket 14 and biases the striker in a counterclockwise direction into engagement with the stop lug 21. The striker lever 20 includes an angular or offset portion 48 which includes a spring impact engaging surface 50 for a purpose to be later described. The lever 20 also includes a bent back portion 52 at its opposite end to provide a predetermined amount of weight for a purpose which will also be described later.

Figure 2:
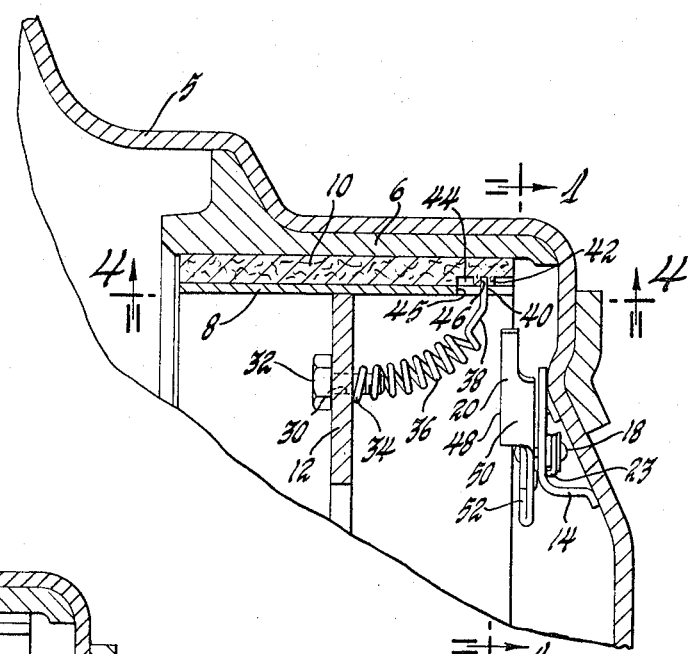
FIGURE 2 is a fragmentary plan view partially in cross section taken in the direction of arrow 2 in FIGURE 1 showing the resilient member being retained within the brake lining.

Referring now to FIGURE 2, the brake shoe web 12 contains an aperture 30 which receives a bolt 32 that retains a first end 34 of a coil compression spring 36. The compression spring 36 has a normally free end 38 which includes an angularly extending end portion 40. The brake lining 10 is machined to provide a button or cylindrical area 42 which is surrounded by an annular groove or cutout 44. The button area 42 is drilled to contain aperture 46 which receives spring end portion 40 as the latter is inserted through an aligned opening 45 provided in brake shoe 8.

Figure 3:
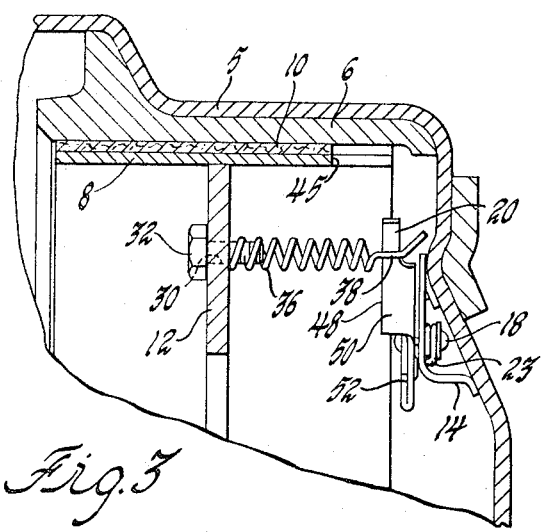
FIGURE 3 is a plan view showing the brake linings in a worn condition and the resilient member in the released position.

In operation, with the brake linings 10 in an unworn condition, as illustrated in FIGURE 2, the wheel drum 6 will rotate and carry lever 20 past the end 38 of compression spring 36 because portion 40 is frictionally retained within aperture 46 in button area 42. Sufficient lining wear results in the severance and falling away of the button area 42 thereby releasing the spring 36 to the position whereby it extends substantially parallel with the drum braking surface engaged by the lining 10 as shown in FIGURE 3. In order to prevent scoring of the brake drum 6, which results from metal to metal contact when the lining is worn away from the brake shoe 8, the button area 42 can be positioned in the lining where the most wear normally occurs. To accomplish such positioning it is only necessary to machine a portion of the shoe 8 to provide opening 45 and form the button 42 so it can fall free when the lining is worn. With the spring 36 in the extended operative position and the wheel drum 6 rotating at low speeds, such as below 20 miles per hour, the angular or offset portion 48 and impact surface 50 of the lever 20 will engage end 38 during each revolution of the drum 6 to provide a clicking noise audible to the vehicle operator. An increase in speed above approximately 20 miles per hour causes the weighted end 52 of lever 20 to rotate in a clockwise direction as indicated by the broken lines in FIGURE 1 since the centrifugal force exceeds the bias of torsion spring 23. When the lever 20 engages stop lug 22, the offset portion 48 is placed in a position where it does not engage the end 38 of compression spring 36 during rotation of the wheel 5, and hence the signal is no longer provided.

From the above description it is apparent that this invention provides a simple mechanism that reliably produces an audible signal indicating that vehicle brake linings are worn only during low vehicle speed ranges. It is also apparent that the amount of weight secured to end 52 of lever 20 can be varied to discontinue the signal at any desired speed and that reference to speeds below 20 miles per hour is made for purposes of illustration only. It is obivous that any maximum signal speed can be obtained by correlating the weighted end 52 to the strength of torsion spring 23.

The above description is intended for purposes of illustration only and the scope of this invention is not to be limited except as required by the following appended claims.

I claim:

1. A brake lining wear signalling device for a vehicle brake assembly having a drum, a brake shoe, and a brake lining on the brake shoe comprising a resilient member connected to the brake shoe and movable between inoperative and operative positions, lining wear responsive means retaining said resilient member in the inoperative position, pivot means mounted on said drum, an anvil like lever member mounted on said pivot means and torsion spring means mounted on said pivot means operatively connnected to said drum and said lever member and biasing said lever member into said operative position, said lining wear responsive means releasing said resilient member to the operative position when sufficient brake lining wear occurs whereby said resilient member is intermittently contacted by said lever member as the drum rotates relative to the brake shoe to produce a signal audible to the operator at low vehicle speeds, said lever member automatically moving to a position out of the path of contact with said resilient member against the torsion spring force in response to centrifugal force acting thereon to discontinue the signal at a predetermined higher vehicle speed.

2. A device as described in claim 1 wherein said resilient member comprises a coil spring.

3. A device as described in claim 1 wherein said lining wear responsive means is positioned at the point of severest lining wear.

4. A device as described in claim 1 wherein said lining wear responsive means comprises an area machined in the brake lining which upon sufficient wear falls away to relase the said resilient member to an operative position.

5. A device as described in claim 1 wherein said lever member comprises an offset portion providing an impact surface engageable by the said resilient member.

6. A device as described in claim 5 wherein said striker lever further comprises a weighted portion which responds to centrifugal force to move said lever impact surface out of the resilient member engaging position against the force of said torsion spring when the vehicle attains a predetermined speed.

7. A brake lining wear signalling device comprising a resilient member having one end connected to a brake shoe having a brake lining thereon and a second end movable between inoperative and operative positions, said brake shoe being non-rotatably mounted within a rotatable brake drum, an arcuate groove machined in said lining forming a stud like member therein, a transverse opening in said stud like member for releasably holding said second end of said resilient member in the operative position, and a striker lever pivotally mounted intermediate its ends on the brake drum and comprising an offset portion at one end and a predetermined weight attached at the other end, said second end of said resilient member being released from said opening when said stud like member wears into said transverse opening thereby allowing said second end of said resilient member to extend into the path of rotation of said lever offset portion, the second end of said resilient member being intermittently contacted by said lever as the drum rotates to produce a signal audible to the operator at low vehicle speeds, said weighted end of the lever automatically moving radially outwardly to change the path of rotation of said lever offset portion in response to centrifugal force acting thereon at speeds above a predetermined higher speed whereby the lever offset portion does not engage said second resilient member end and the audible signal is discontinued.

No references cited.

LOUIS J. CAPOZI, *Primary Examiner.*